(12) United States Patent
Wong et al.

(10) Patent No.: US 6,813,633 B2
(45) Date of Patent: Nov. 2, 2004

(54) DYNAMIC MULTI-LEVEL CACHE MANAGER

(75) Inventors: Frankie Chibun Wong, Pickering (CA); Thomas Teiping Liu, Scarborough (CA)

(73) Assignee: Foedero Technologies, Inc., Pickering (CA)

( * ) Notice: Subject to any disclaimer, the term of this patent is extended or adjusted under 35 U.S.C. 154(b) by 310 days.

(21) Appl. No.: 10/173,614

(22) Filed: Jun. 19, 2002

(65) Prior Publication Data

US 2003/0005228 A1 Jan. 2, 2003

Related U.S. Application Data

(60) Provisional application No. 60/298,913, filed on Jun. 19, 2001.

(51) Int. Cl.[7] .............................................. G06F 13/14
(52) U.S. Cl. ...................................................... 709/217
(58) Field of Search ................................ 709/213, 214, 709/217

(56) References Cited

U.S. PATENT DOCUMENTS

| | | | | |
|---|---|---|---|---|
| 6,185,608 B1 | * | 2/2001 | Hon et al. ................... | 709/216 |
| 6,351,767 B1 | * | 2/2002 | Batchelder et al. .......... | 709/219 |
| 6,408,360 B1 | * | 6/2002 | Chamberlain et al. ....... | 711/124 |
| 6,457,103 B1 | * | 9/2002 | Challenger et al. .......... | 711/133 |
| 6,584,548 B1 | * | 6/2003 | Bourne et al. ............... | 711/134 |
| 6,591,266 B1 | * | 7/2003 | Li et al. ........................ | 707/10 |
| 6,622,168 B1 | * | 9/2003 | Datta ........................... | 709/219 |
| 6,697,849 B1 | * | 2/2004 | Carlson ....................... | 709/219 |

* cited by examiner

*Primary Examiner*—Kevin L. Ellis
(74) *Attorney, Agent, or Firm*—Gowling Lafleur Henderson LLP

(57) ABSTRACT

A method of caching data in a multi-processor computing environment, involves the steps of receiving from one of a plurality of network clients a request for a data item; establishing a private cache uniquely associating with the network client; associating the private cache with a shared cache, the shared cache including the requested data item and being associated with a number of the network clients; and updating the private cache with the requested data item. In one aspect, the shared cache includes a subset of a store of dynamically-variable data, and the method also involves storing in the shared cache a data update received from one of the network clients; receiving from another of the network clients a request for an item of the variable data; and updating the private cache of the one network client with the update data and the requested data item.

25 Claims, 7 Drawing Sheets

DYNAMIC MULTI-LEVEL CACHE MANAGER

This application claims benefit of 60/298,913, filed Jan. 19, 2001.

FIELD OF THE INVENTION

The present invention relates to a multiprocessor caching system. In particular, the present invention relates to a method and apparatus for caching dynamically-changing data in a multiprocessor environment.

BACKGROUND OF THE INVENTION

Multiprocessor computing systems typically use a caching server disposed between the processors and a common file server to improve system performance. For instance, to improve access by client terminals to HTML servers in a World Wide Web environment, an enterprise uses a web server for caching HMTL data requested by all of the enterprise's client terminals. In addition, each client terminal is equipped with a dedicated software cache which caches the HTML data requested by the client terminal.

This approach increases system performance since a subsequent request by a client terminal for static HTML data previously requested from an HTML server can be satisfied locally by accessing either the terminal's dedicated cache or the web server cache, without having to request the data again from the HTML server. However, the conventional caching server cannot offer improved system performance for client queries based on dynamically-changing data, since the caching server cannot determine if the data upon which a previous query was based has changed. Instead, the conventional web caching server accesses web search engines to satisfy client data queries based on dynamically changing data. Still, web search engines typically satisfy search queries by maintaining and periodically updating a database of web server content. Consequently, web search engines frequently return search results which consists of pointers to data which has long since expired.

Attempts have been made to improve the performance of multi-processor computing systems in respect of dynamically-changing data. For instance, Gannon (U.S. Pat. No. 5,265,232) discloses a multiple processor caching system which includes a storage controller, a cross-invalidate directory stored in the storage controller, and a number of processors in communication with the storage controller. Each processor has its own private L1 store-through cache and associated L1 cache directory. The system also includes a shared L2 cache and/or a main memory.

The cross-invalidate directory has entries each associated with a respective data unit of the L2 cache and main memory. Each cross-invalidate directory entry includes a processor identifier field identifying which processor owns the associated data, and indicates whether the ownership is exclusive or public. Exclusive ownership means that only one of the processors has ownership over the data unit (ie. the identified processor can write to the data unit). Public ownership means that all of the processors have ownership over the data unit (ie. all processors can read from but not write to the data unit).

If one of the processors requests a change in ownership over a data unit (eg. to overwrite the data unit), the request identifies the data unit to be changed, the requesting processor and the ownership type requested. The storage controller queries the directory for the processors which have ownership over the data unit, and transmits a request to the identified processors to terminate their respective ownerships over the data unit, both in the L1 and the L2 cache. Each processor which receives the request updates their respective L1 cache directory to indicate that the data unit is no longer available in their respective L1 cache, and then signals the storage controller that the processor has terminated its ownership over the data unit. Once all ownership over the data unit has terminated, the storage controller updates the cross-invalidate directory to reflect the new ownership of the data unit, and then modifies the data unit in the L2 cache and main memory as requested by the requesting processor. The other processors must then access the L2 cache or main memory to obtain a copy of the modified data unit (copying same into their respective L1 cache).

Mackenthun (U.S. Pat. No. 6,122,711) discloses a dual cluster multi-processing system which includes a pair of multi-processing clusters interconnected with a main memory and a system controller over a local area network. Each cluster includes a number of processors each having a dedicated store-through cache. Each cluster also includes a storage controller connected to the processors. The storage controller includes a second level cache, and a database of tags. The tags include copies of the data in the first level caches of the processors which are connected to the respective storage controller. The tags also include flags which identify the status of each cache element (valid, modified), and the processor which "owns" the cache element. If a processor intends to write to its second level cache, the processor must be designated as the owner of the cache element. Only one processor can be designated as the owner of a cache element, although the owner can change.

If a processor (eg. of the first cluster) requests access to a data element, the first storage controller checks its tag database to determine if the element is cached in the second level cache and, if so, if the data in the cached element is valid. If the cached element is present and valid, the first storage controller retrieves the cached element for the processor from the second level cache.

However, if the cached element is not present, or is not valid, the second storage controller checks its tag database to determine if it has a valid cached copy of the data element. If the second storage controller does not have a cached copy of the data element, the data is retrieved from the main memory and stored in the second level cache of the first storage controller. The first storage controller then updates its tag database to indicate that the first storage controller is the owner of the cache element, and provides the processor with the cached element.

On the other hand, if the second storage controller does have a valid cached copy of the data element, the second storage controller transmits the cached element to the first storage controller, and then invalidates its own copy of the cached element by updating the appropriate flag in its tag database. The first storage controller then updates its tag database to indicate that the first storage controller is the owner of the cache element, and provides the processor with the cached element.

If the processor of the first cluster subsequently modifies the cached element, the first storage controller keeps a copy of the modified cached element in its second level cache, and then updates its tag database to indicate that the cached data is different from the data stored in the main memory. If an operator subsequently decides to remove one of the clusters from the system, the system controller retrieves from the first storage controller all second level cache elements which are owned by the first storage controller and whose corresponding tag indicates that the cached data is different from the data stored in the main memory. The system controller then stores the retrieved data in the main memory.

Although both Gannon and Mackenthun are able to offer some improvement in system performance in respect of dynamically-changing data, the performance improvement is limited by the need for a centralized storage controller which controls access by the processors to the shared data. In both solutions, a write request must be acted upon by the storage controller before access to the shared data is granted.

Further, both solutions are unable to provide any improvement in system performance for network clients making similar data queries based on the dynamically-changing data, since the caches can only mirror the contents of the main system memory. These limitations render both solutions inadequate for widely-distributed multi-processing environments, such as World Wide Web computing.

Accordingly, there remains a need for a computing solution which can enhance system performance in respect of dynamically-changing data in a widely-distributed multi-processing environment.

SUMMARY OF THE INVENTION

According to a first aspect of the present invention, there is provided a method of caching data, which involves the steps of:

receiving from one of a number of network clients a request for a data item;

creating a private cache uniquely associated with the network client;

initiating association of the private cache with a shared cache, the shared cache including the requested data item and being associated with a number of the network clients; and updating the private cache with the requested data item.

According to a second aspect of the present invention, there is provided a caching server which includes:

receiving means for receiving from one of a number of network clients a request for a data item;

cache establishing means in communication with the receiving means for creating a private cache uniquely associated with the one network client;

cache associating means in communication with the cache establishing means for initiating association of the private cache with a shared cache, the shared cache including the requested data item and being associated with a number of the network clients; and updating means for updating the private cache with the requested data item.

According to a third aspect of the present invention, there is provided a method of caching dynamically-variable data, which involves the steps of:

maintaining a store of dynamically-variable data and a shared cache, the shared cache being associated with a plurality of network clients and including a subset of the data store;

receiving from one of the network clients a data update to the shared cache, and storing the updated data in at least the shared cache;

receiving from one other of the network clients a request for an item of the variable data; and initiating updating of a private cache associated with the one other network client, the private cache being uniquely associated with the one other network client and including a respective portion of the data subset, the data portion including the requested data item and cache data corresponding to the updated data.

According to a fourth aspect of the present invention, there is provided a caching server which includes:

a shared cache associated with a plurality of network clients;

data update means in communication with the shared cache for receiving from one of the network clients a data update to the shared cache, and storing the updated data in at least the shared cache;

receiving means for receiving from one other of the network clients a request for an item of the variable data; and updating means for updating a private cache associated with the one other network client, the private cache being uniquely associated with the one other network client and including a respective portion of the data subset, the data portion including the requested data item and cache data corresponding to the updated data.

According to a fifth aspect of the present invention, there is provided a method of caching dynamically-variable data, which involves the steps of:

maintaining a store of dynamically-variable data, the data store including one of application data, and user session data;

dynamically establishing a first level cache and a second level cache in response to a request for the stored data, the caches caching data comprising a subset of the stored data; and dynamically removing at least one of the caches after invalidation thereof.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

Figure 1:
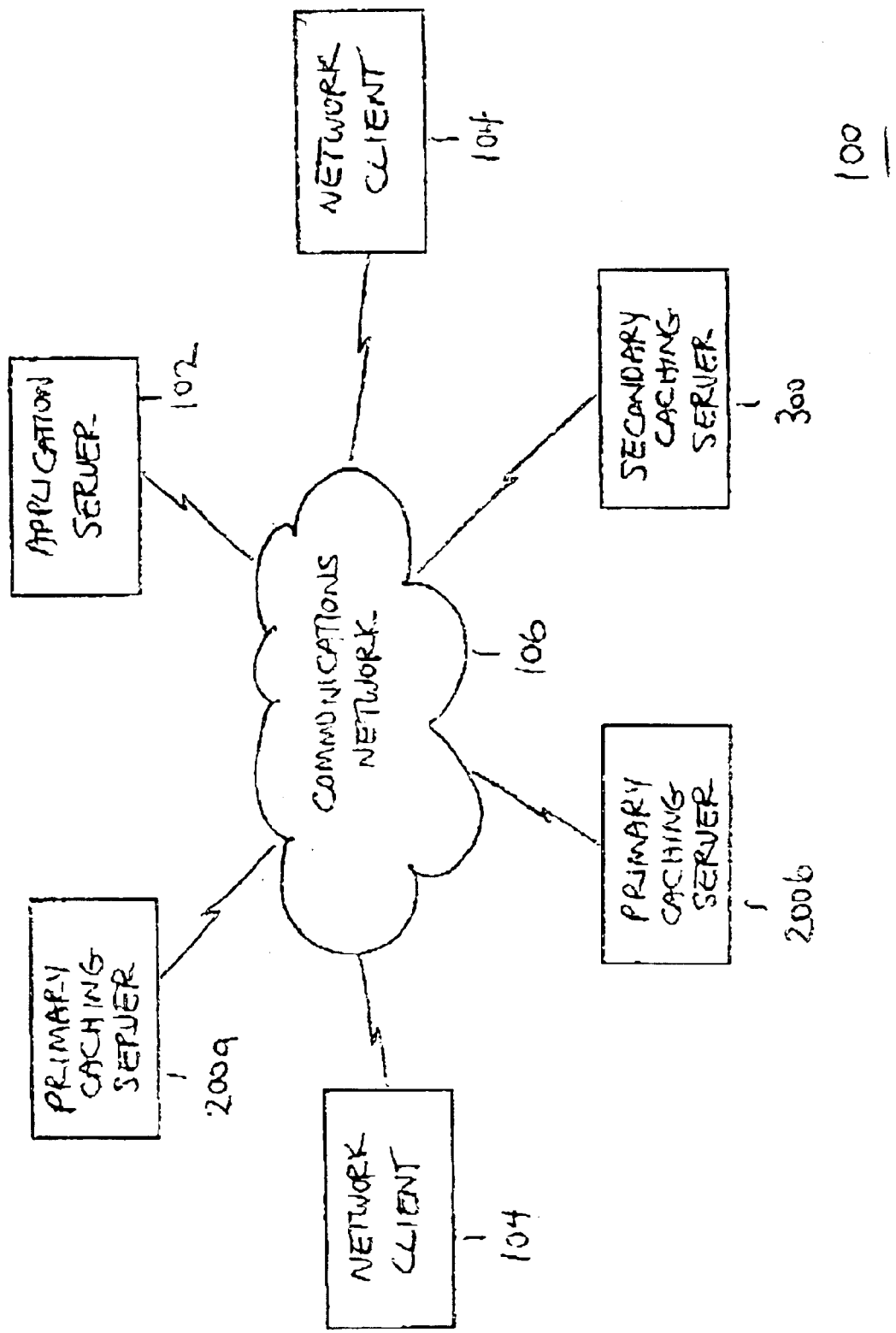
FIG. 1 is a schematic view of the multi-processor computer system, according to a first aspect of the present invention, depicting the application server, the network clients, the primary caching servers and the secondary caching server.

One embodiment of a multi-processor computing system is shown in FIG. 1. As shown, the multi-processor computing system, denoted generally as 100, comprises an application server 102, a number of network clients 104, a pair of primary caching servers 200a, 200b, a secondary caching server 300, and a network 106 interconnecting the application server 102, the network clients 104 and the caching servers 200, 300. Although the multi-processor computing system 100 is shown comprising a single application server 102, a pair of primary caching servers 200, and a single secondary caching server 300, the computing system 100 may include any number of application servers 102 and caching servers 200, 300.

Typically, the network 106 is a wide-area network, such as the Internet, however the network 106 may also be an enterprise local area network. Further, the network 106 typically comprises a wired network, however the network 106 may also comprise a wireless network or a combination of wired and wireless networks.

The application server 102 is implemented as a computer server, and is configured with application software and associated application data accessible by the network clients 104 over the network 106. Typically, the application server 102 is implemented as an HTML server which is configured with HTML pages and associated data, accessible by the network clients 104 over the Internet 106. However, it should be understood that the application server 102 need not be implemented as an HTML server, but may be configured to provide the network clients 104 with other forms of data.

Each primary caching server 200 is shown connecting a number of the network clients 104 to the network 106. Typically, the network clients 104 associated with each primary caching server 200 are related. For instance, the network clients 104 associated with the first primary caching server 200a are typically affiliated with one enterprise, and the network clients 104 associated with the second primary caching server 200 are affiliated with another enterprise.

Figure 2:
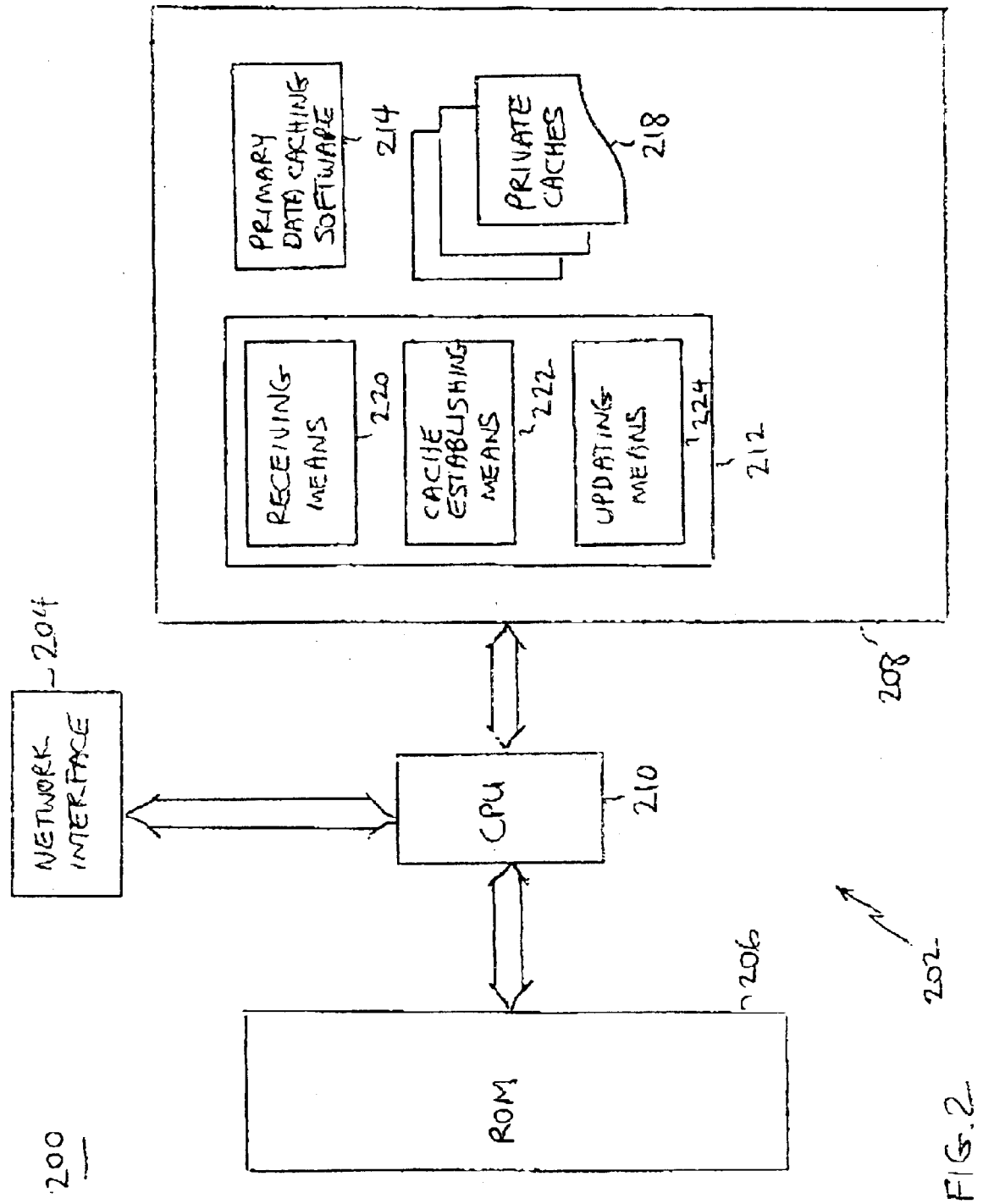
FIG. 2 is a schematic view of one of the primary caching servers depicted in FIG. 1.

Preferably, each primary caching server 200 is configured as a web server, and is connected to the network 106 via an enterprise firewall (not shown) or proxy server, to thereby provide the associated network clients 104 with secure access to the HTML server 102 via the Internet. As shown in FIG. 2, the primary caching server 200 includes a data processing system 202, and a network interface 204 for interfacing the data processing system 202 to the network 106. The data processing system 202 includes a non-volatile memory (ROM) 206, a volatile memory (RAM) 208, and a central processing unit (CPU) 210 interconnecting the ROM 206 and the RAM 208.

The ROM 206 may be implemented as a magnetic memory, an optical memory and/or an electronic memory. The ROM 206 includes processing instructions for the CPU 210 which, when loaded into the RAM 208, comprises client/server connectivity software 212, and primary data caching software 214. The connectivity software 212 maintains communications channels between each network client 104 and the application server 102 in a manner well known to those of ordinary skill in the art. The connectivity software 212 establishes and maintains each communications channel for the life of the session between the respective network client 104 and the application server 102, and then removes the communications channel after the respective session is terminated.

The primary data caching software 214 is configured to establish, maintain and manage individual private caches 218 for the network clients 104 associated with the primary caching server 200. For enhanced performance preferably the primary caching software 214 maintains the private caches 218 in the RAM 208, although the private caches 218 may also be maintained in the ROM 206.

Each private cache 218 is uniquely associated with one of the network clients 104, and includes user data associated with each client-server session. Typically, the user data includes sort/filter/query meta-data defining parameters for sort, filter and/or query commands/operations issued by the user of the network client 104 during the life of the client-server session. Additionally, the user data typically includes the results of such commands/operations.

As shown, the primary data caching software 214 includes receiving means 220, cache establishing means 222, and updating means 224. The receiving means 220 is configured to receive from the network clients 104 a request for application data. The cache establishing means 222 is in communication with th receiving means 220, and is configured to create a private cache 218 uniquely associated with each network client 104 requesting application data. The updating means 224 is configured to update the private cache 218 with the requested application data.

Figure 3:
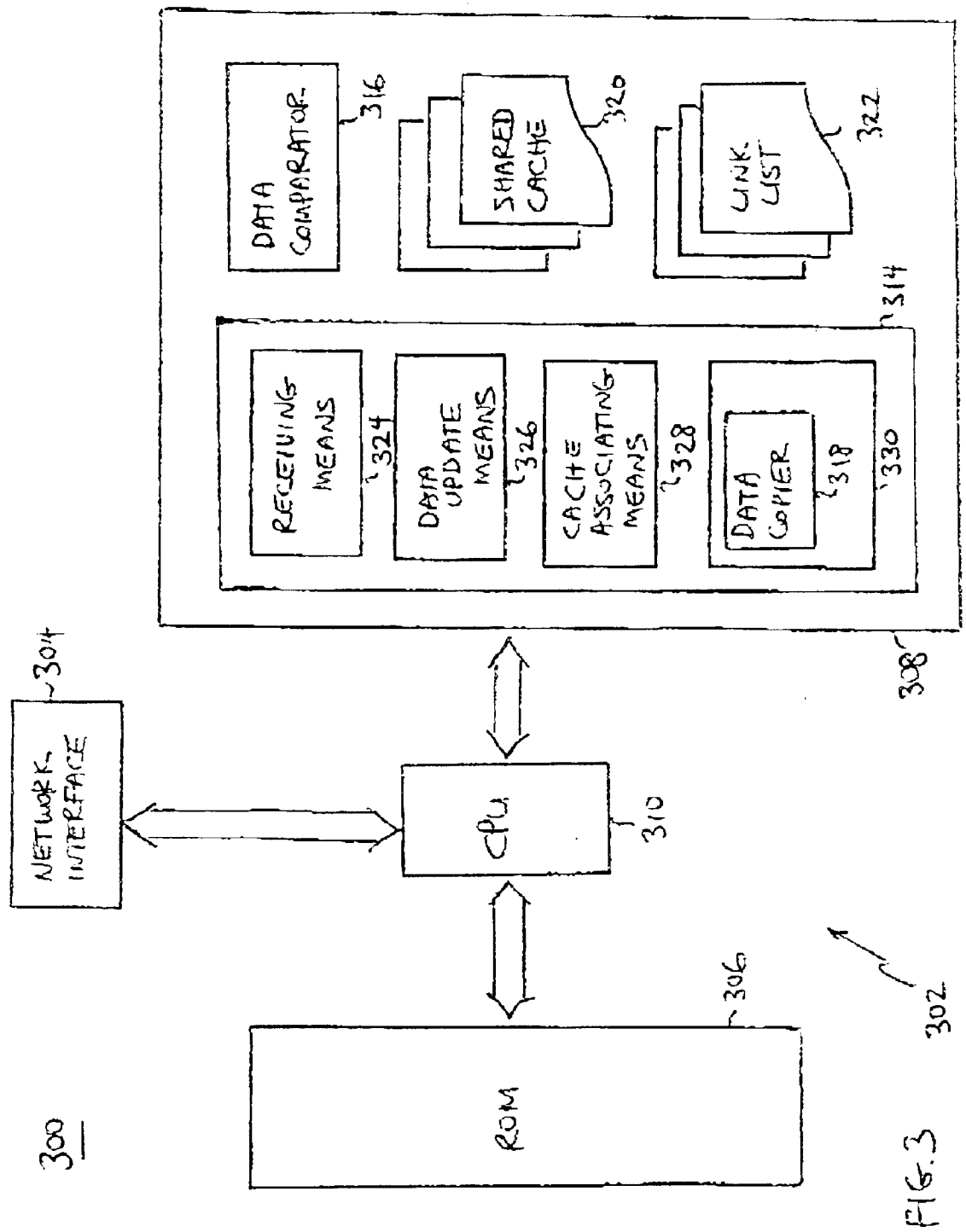
FIG. 3 is a schematic view of the secondary caching server depicted in FIG. 1.

The secondary caching server 300 is a computer server, and is in communication with the application server 102 over the network 106. As shown in FIG. 3, the secondary caching server 300 includes a data processing system 302, and a network interface 304 for interfacing the data processing system 302 to the network 106. The data processing system 302 includes a non-volatile memory (ROM) 306, a volatile memory (RAM) 308, and a central processing unit (CPU) 310 interconnecting the ROM 306 and the RAM 308. The ROM 306 may be implemented as a magnetic memory, an optical memory and/or an electronic memory. The ROM 306 includes processing instructions for the CPU 310 which, when loaded into the RAM 308, comprises secondary data caching software 314, and optionally a data comparator 316.

The secondary data caching software 314 establishes, maintains and manages one or more shared caches 320 for the network clients 104 accessing data from the application server 102. Each shared cache 320 is associated with the private caches 216 managed by a respective one of the primary caching servers 200, and includes a subset of the application data maintained in the application server 102. The shared cache data also includes sort/filter/query meta-data defining parameters for sort, filter and/or query commands/operations issued by the users of the network clients 104 of the associated primary caching server 200. Additionally, the shared cache data includes the results of the commands/operations.

Typically, the secondary data caching software 314 establishes a separate shared cache 320 for each sort/filter/query command. Accordingly, to assist in the management of the shared caches 320, the secondary data caching software 314 groups together the shared caches 320 associated with each primary caching server 200, and maintains link lists 322 each pointing to a separate group of the shared caches 320. By associating each primary caching server 200 with a respective one of the link lists 322, different primary caching servers 200 can use the same "name" for different shared caches 320, without conflict.

As shown, for enhanced performance preferably the secondary caching software 314 maintains the shared caches 320 and the link lists 322 in the RAM 308, although the shared caches 320 and the link lists 322 may also be maintained in the ROM 306. As will be discussed below, the secondary caching server 300 uses the shared data cached in the shared caches 320 to enhance system performance for similar or identical sort/filter/query commands issued to the application server 102 by different network clients 104. Also, to further enhance system performance, the primary caching server 200 copies from the shared caches 320 into each private cache 218 the son/filter/query commands previously issued by the associated network client 104, in addition to the results of these commands.

As shown, the secondary data caching software 314 includes receiving means 324, data update means 326, cache associating means 328, and updating means 330. The receiving means 324 is configured to receive a request initiated by the network clients 104 for application data. The data update means 326 is configured to receive from the network clients 104 a data update for one of the shared caches 320, and to store the updated data in the shared cache 320 and optionally in the application server 102. The cache associating means 328 is in communication with the primary caching server 200, and is configured to associate each private cache 218 created by the primary caching server 200 with one of the shared caches 320.

The updating means 330 is configured to copy application data from the application server 102 into the shared cache 320, and to signal the primary caching server 200 to copy the data from he shared cache 320, to thereby update tie private caches 218 with the data requested by the associated network client 104. Preferably, the updating means 330 includes a data copier 318 which maintains an archive of each sort/filter/query command issued to the secondary data caching software 314. Since the data copier 318 is optional, the shared cache 320 optionally includes a data copier interface to make use of the data copier 318. The secondary caching server 300 uses the data copier 318 to perform partial or full refreshes of the data stored in the shared cache 330. Further, in the event that the shared cache 320 is destroyed inadvertently (eg. as a result of a system failure) or deliberately (eg. as a result of a termination command issued by the applications software), the secondary caching server 300 invokes the data copier 318 to rebuild the contents of the shared cache 320 by re-issuing the commands previously issued The data comparator 316 is an optional applications program interface (API) to an external software routine which defines the mechanism by which the secondary caching server 300 can process sort/filter/query commands issued by the network clients 104 over the application data. For instance, although the mechanism by which sort commands can be implemented in respective to text data is well known, the mechanism by which sort or filter commands can be implemented in respect to audio or visual data files will vary in accordance with the form of the data files. The data comparator 316 allows the secondary caching server 300 to make calls to software routines (developed by applications programmers) tailored to the application data contained in the application server 102. As will be apparent, the use of the data comparator 316 allows the secondary caching server 300 to process sort/filter/query commands without requiring that the routines necessary for processing these command be defined at the time the secondary caching server 300 is deployed.

Figure 4:
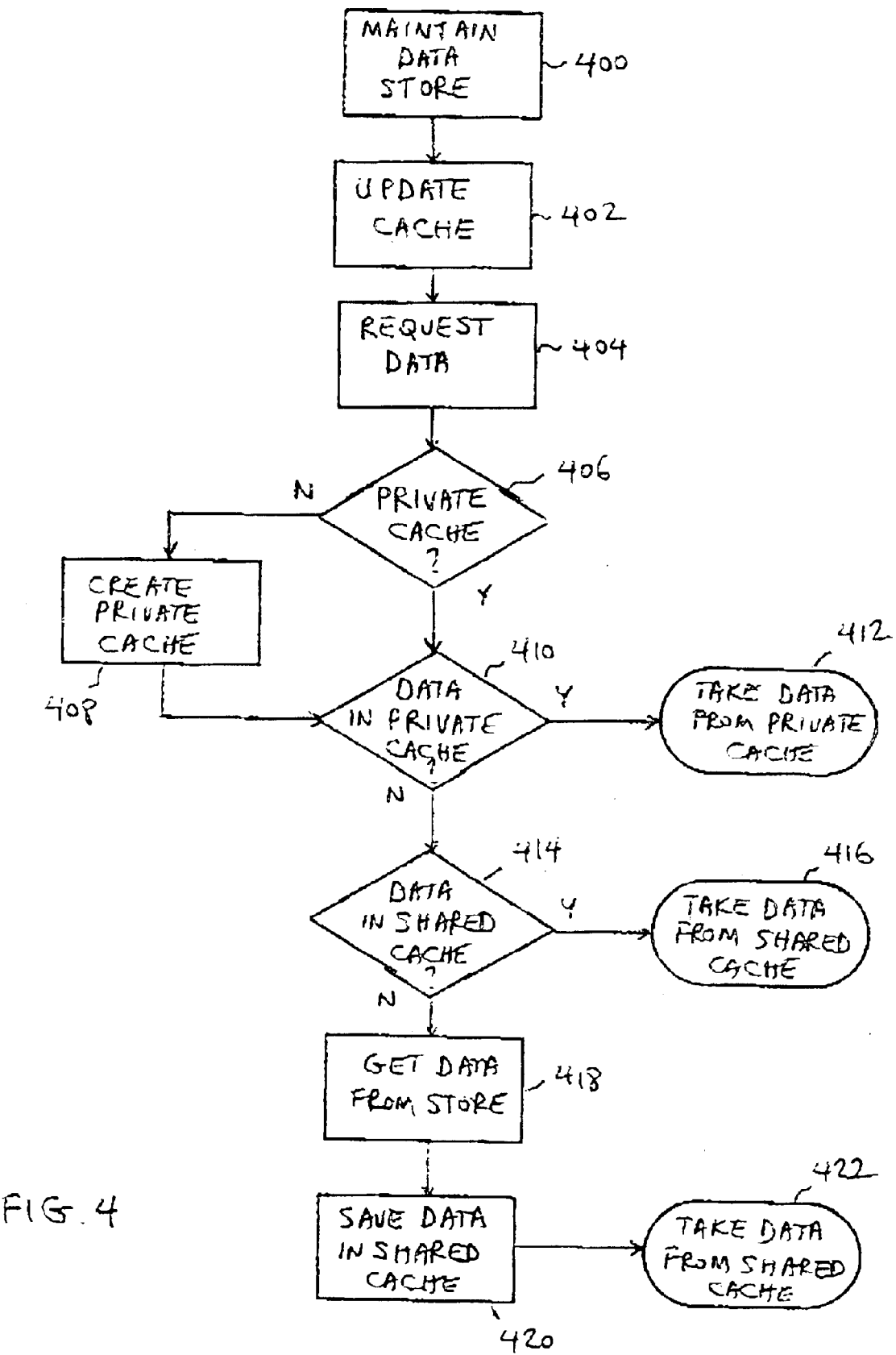
FIG. 4 is a flowchart which provides a general overview of the method of operation of the multi-processor computing system shown in FIG. 1.
Figure 5:
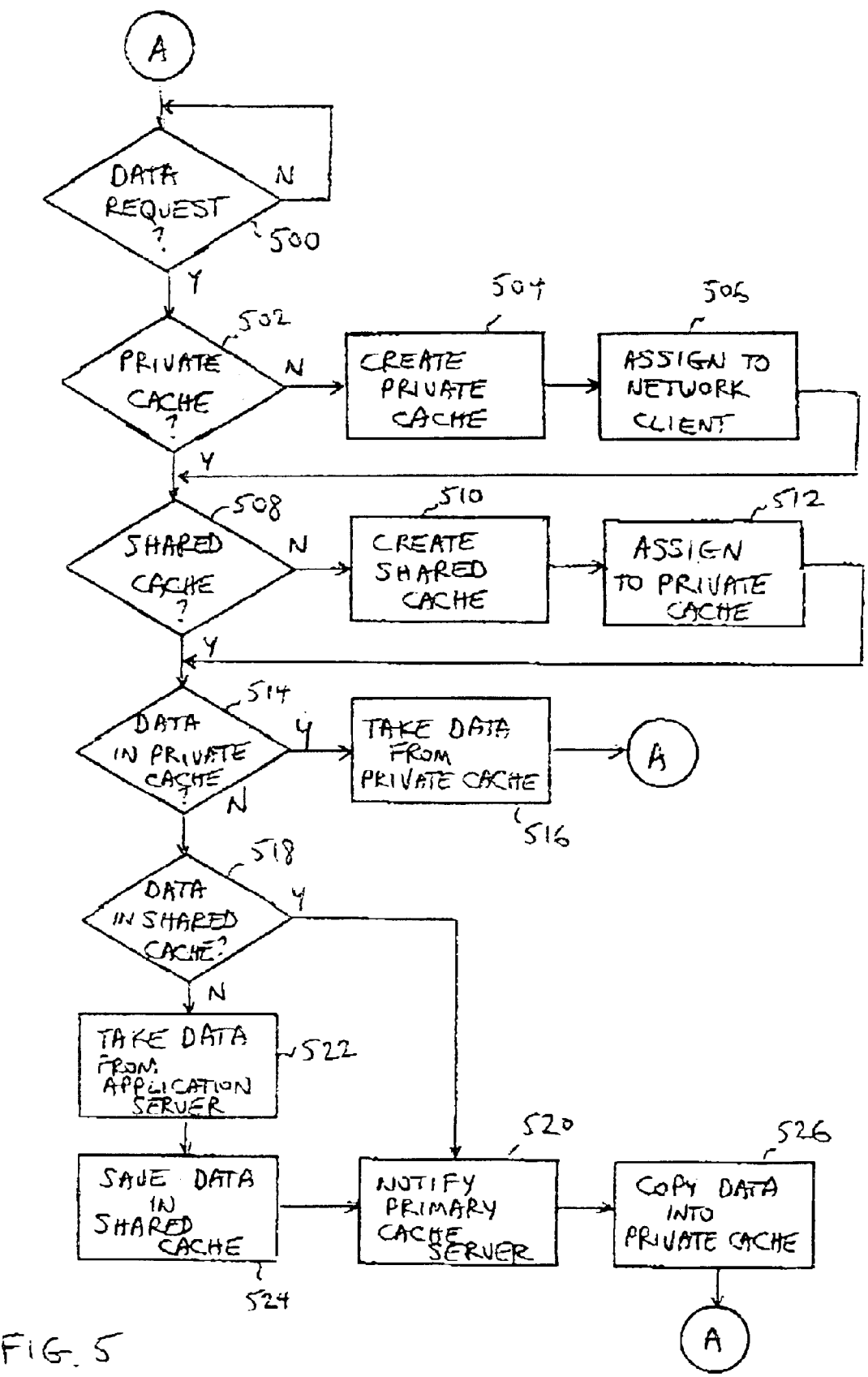
FIG. 5 is a flowchart which depicts the method for allocating private and shared caches with the multi-processor computing system, and for reading data from the caches.

The operation of the multi-processor computing system 100 will now be described generally with reference to FIG. 4, and then in detail with reference to FIGS. 5 and 6. As shown in FIG. 4, at step 400 the application server 102 maintains a store of dynamically-variable application data. The primary caching server 200 also allocates a dedicated private cache 218 for each network client 104 as needed, and the secondary caching server 300 creates a shared cache 320 for the private caches 218. The shared cache 320 includes a subset of the dynamically-variable application data, and each private cache 218 includes a portion of the data cached in the shared cache 320.

If the primary caching server 200 receives a data update from one of the network clients 104, the primary caching server 200 passes the data update to the secondary caching server 300. The secondary caching server 300 stores the data update in the application data store and in the shared cache 320, at step 402.

If, at step 404, the primary caching server 200 receives from one of the network clients 104 a request for the application data, at step 406 the primary caching server 200 determines whether a private cache 218 has been established for the network client 104 which requested the application data. If no private cache 218 exists for the network client 104, the primary caching server 200 creates the private cache 218 for the network client 104, at step 408, and the secondary caching server 300 associates the private cache 218 with the shared cache 320.

At step 410, the primary caching server 200 determines whether the requested data is stored in the private cache 218 of the network client 104 which requested the application data. If the requested data is stored in the private cache 218, and is not out of date, the primary caching server 200 signals the network client 104 to copy the requested data from the private cache 218, at step 412. On the other hand, if the requested data is not stored in the private cache 218, or the data is out of date, at step 414 the secondary caching server 300 determines whether the shared cache 320 associated with the private cache 218 of the requesting network client 104 includes the requested application data. If the requested data is stored in the shared cache 218, the secondary caching server 300 responds to the primary caching server 200 with the requested data from the shared cache 320, at step 416.

On the other hand, if the requested data is not stored in the shared cache 320, at step 418 the secondary caching server 300 requests the application data from the application server 102. The secondary caching server 300 then stores the application data in the shared cache 320, at step 420. The secondary caching server 300 responds to the primary caching server 200 with the requested application data, at step 422, including any data already stored in the private cache 218 which is out-of-date with respect to the corresponding data stored in the shared cache 320. The primary caching server 200 then updates the private cache 218 of the requesting network client 104 with the data received from the secondary caching server 300, and signals the network client 104 to copy the requested data from the private cache 218.

The method for allocating the private caches 218 and the shared caches 320 within the multi-processor computing system 100, and for reading data from the caches 218, 320 will now be described in detail with reference to FIG. 5. If, at step 500, a network client 104 passes to the receiving means 220 of the primary caching server 200 a request for application data from the application server 102, at step 502 the primary caching server 200 determines whether a private cache 218 exists for the network client 104. A private cache 218 for the network client 104 will not exist if the network client 104 had not previously initiated a session with the application server 102, or if the session was terminated either intentionally or accidentally (eg. as a result of a failure of the primary caching server 200). In the latter situation, the primary data caching software 214 removes the private cache 218 after the primary caching server 200 detects that user session has been terminated.

If no private cache 218 exists for the network client 104, at step 504 the cache establishing means 222 of the primary caching server 200 creates a private cache 218 in the RAM 208, and uniquely associates the newly-created private cache 218 with the network client 104. The primary caching server 200 then requests that the secondary caching server 300 associate a shared cache 320 with the newly-created private cache 218, at step 506.

At step 508, the cache associating means 328 of the secondary caching server 300 determines whether a shared cache 320 exists for the private cache 218 of the network client 104. If no shared cache 320 exists, at step 510 the cache associating means 328 creates a shared cache 320 in the RAM 308. To do so, the cache associating means 328 defines the data comparator 316 (if desired), and then defines the following meta-data variables:

Last Access Time (LAT)=Current Time (CT)

Last Refresh Time (LRT)=Current Time (CT)

Last Change Time (LCT)=Current Time (CT)

In addition to the foregoing meta-data variables, the cache associating means 328 sets the Keep Idle Time parameter and the Refresh Interval parameter. As will become apparent, the secondary data caching software 314 uses these variables and parameters to determine when the shared cache 320 and/or data contained therein has expired. For instance, to free up system resources which are no longer needed, the secondary data caching software 314 removes a shared cache 320 from the ROM 308 and the link list 322 if:

Last Access Time (LAT)+Keep Idle Time>Current Time (CT)

At step 512, the cache associating means 328 assigns the shared cache 320 to one of the link lists 322, and associates the shared cache 320 with the private cache 218 of the network client 104 which requested the application data.

If at step 508 the secondary caching server 300 determined that a shared cache 320 existed for the private cache 218 of the network client 104, at step 514 the primary data caching software 214 queries the private cache 218 associated with the network client 104 to determine whether the private cache 218 contains the requested application data and the application data in the private cache 218 is not out of date with respect to the shared cache data. Typically, the primary data caching software 214 will determine whether the private cache data is out of date by comparing the date and/or size and/or checksum values of the data stored in the shared cache 320 against the corresponding parameters of the data stored in the private cache 218. However, other mechanisms can be used, including checking the data stored in the shared cache 320 for any set archive bits.

If the private cache 218 contains the requested application data and the application data in the private cache 218 is not out of date, at step 516 the primary data caching software 214 responds to the query of the network client 104 with the requested data from the private cache 218.

On other hand, if the private cache 218 does not contain the requested application data or the application data in the private cache 218 is out of date, the primary data caching software 214 queries the second caching server 300 for the requested application data. At step 518, the secondary data caching software 314 (or the data comparator 316, if defined) queries the shared cache 320 associated with the network client's private cache 218 for the requested application data, and then sets:

Last Access Time (LAT)=Current Time (CT)

If the secondary data caching software 314 (or the data comparator 316, if defined) determines that the shared cache 320 includes the requested application data, at step 520 the updating means 330 of the secondary data caching software 314 notifies the primary data caching software 214 that the requested data is stored in the shared cache 320, thereby signaling the primary caching server 200 to copy of the requested data from the shared cache 320.

If the network client 104 issued a command which involved more than a simple query for application data (eg. required filtering and/or sorting of the application data), the updating means 330 stores the command in the shared cache 320 as meta-data, together with the results of the command. By saving both the application data command and the resulting data in the shared cache 320, the secondary cache 300 is able to re-use the saved data in satisfying queries issued subsequently by other network clients 104. As a result, the secondary cache 300 is able to improve system performance for frequently-issued application data commands, even if the commands are issued by different network clients 104.

If at step 518, the secondary data caching software 314 determines that the shared cache 320 does not include the requested application data, at step 522 the secondary data caching software 314 (or the data comparator 316, if defined) issues a query to the application server 102 for the requested application data. Upon receipt of the requested application data from the application server 102, at step 524 the data copier 318 stores the returned application data in the shared cache 320. As above, if the network client 104 issued a command which involved more than a simple query for application data, the data copier 318 stores the command in the shared cache 320 as meta-data, together with the results of the command. The updating means 330 then notifies the primary data caching software 214 that the requested data is stored in the shared cache 320.

After the primary data caching software 214 is notified that the requested data is stored in the shared cache 320, the updating means 224 of the primary data caching software 214 copies the requested data from the shared cache 320, and saves a copy of the response and the command meta-data in the network client's private cache 218 at step 526. The primary caching software 214 then responds to the query of the network client 104 with the saved data.

Figure 6A:
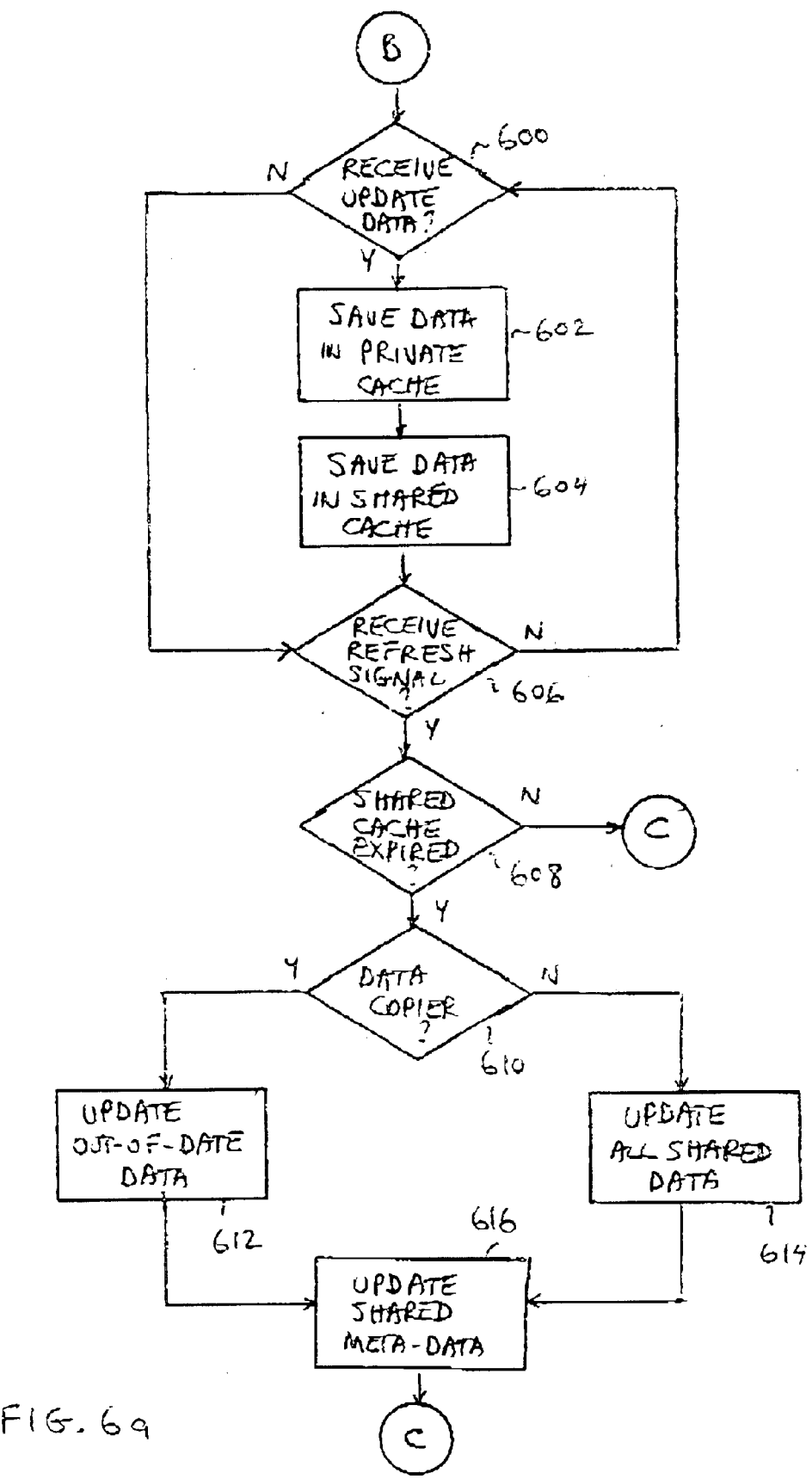
FIGS. 6a to 6b together comprise a flowchart which depicts the method for updating and refreshing data in the private and shared caches.
Figure 6B:
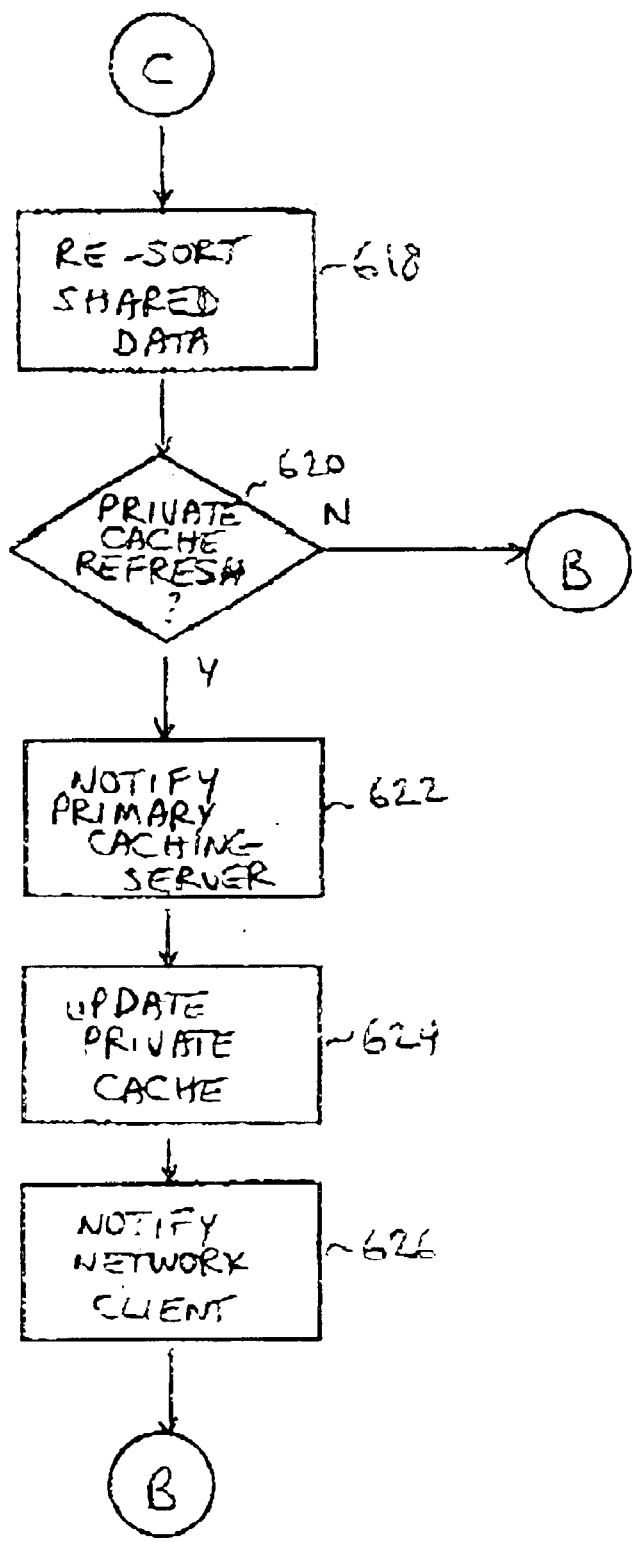

The method for updating and refreshing the data in the private caches 218 and the shared caches 320 will now be described in detail with reference to FIGS. 6a to 6b. If, at step 600, a network client 104 passes to the receiving means 220 of the primary caching server 200 a data update for storing in the network client's private cache 218 and in the shared cache 320, at step 602 the primary data caching software 214 of the primary caching server 200 saves the update data in the network client's private cache 218, and then passes the update data to the secondary caching server 300. Upon receipt of the update data at the secondary caching server 300, at step 604 the secondary data caching software 314 saves the update data in the shared cache 320 associated with the network client's private cache 218.

The secondary data caching software 314 then updates the following meta-data variables:

Last Access Time (LAT)=Current Time (CT)

Last Change Time (LCT)=Current Time (CT)

and passes the update data over the network 106 for storage in the application server 102. As will be apparent, a similar mechanism is followed if one of the network clients 104 passes a request to the secondary caching server 300 to remove one of the stored data items.

If, at step 606, the secondary data caching software 314 has received a cache refresh signal, at step 608 the secondary data caching software 314 determines if the shared cache 320 has expired. The cache refresh signal may be initiated manually by a user of one of the network clients 104, automatically as a result of a refresh HTML meta-tag of a web page requested from the application server 102 by one of the network clients 104, or automatically by the application server 102 when the application server 102 receives update data which renders the data stored in the shared cache 320 out of date.

The shared cache 320 is deemed to have expired if:

Last Change Time (LCT)−Last Refresh Time (LRT)>Refresh Interval, and

Last Change Time (LCT)>Last Refresh Time (LRT).

If the shared cache 320 has expired, at step 610 the secondary data caching software 314 determines whether the shared cache 320 made use of the data copier 318. If a data copier 318 was used, at step 612 the data copier 318 refreshes the shared cache 320 by updating any data stored therein which is out of date with respect to the data stored in the application server 102. Typically, the data copier 318 updates the shared cache 320 by first comparing the date and/or size and/or checksum values of the data stored in the shared cache 320 against the corresponding parameters of the data stored in the application server 102 to determine whether the shared cache data is out of date, and then overwriting the out-of-date data in the shared cache 320 with the corresponding data from the application server 102. Further, if the size of the stored data items is large, the data copier 318 can reduce the time and resources to complete an update by performing an incremental update, such as by updating only the bit sequences or records of each data item which have changed.

On the other hand, if, at step 610, the secondary data caching software 314 determines that the shared cache 320 did not make use of the data copier 318, at step 614 the secondary data caching software 314 updates the shared cache 320 by overwriting the data stored in the shared cache 320 with the corresponding data stored in the application server 102.

After the shared cache 320 is updated, at step 616 the secondary data caching software 314 updates the following meta-data variables:

Last Change Time (LCT)=Current Time (CT)

Last Refresh Time (LRT)=Current Time (CT)

If the shared cache 320 included out-of-date data which resulted from commands which involved more than a simple query for application data, at step 618 the secondary data caching software 314 re-executes the stored commands, to thereby update the saved query results. If the secondary data caching software 314 used the data comparator 316 to originally execute the data sort/filter/query command, the secondary data caching software 314 again makes use of the data comparator 316 in re-executing the stored commands.

After the data sort/filter/query commands have been re-executed, the secondary data caching software 314 updates the following meta-data variable:

Last Access Time (LAT)=Current Time (CT)

If the cache refresh was initiated at step 606 by an external event, such as an update to the application data, the private cache 218 is not updated at this time. However, if the cache refresh was initiated at step 606 either by a user of one of the network clients 104, or as a result of a refresh HTML meta-tag of a web page requested from the application server 102 by one of the network clients 104, the process proceeds to step 622.

At step 622, the updating means 330 notifies the primary data caching software 214 that the shared cache 320 has been refreshed. Then, at step 624, the updating means 224 of the primary data caching software 214 updates the data stored in the private cache 218 of the network client 104 which initiated the cache refresh. As above, the primary data caching software 214 typically updates the private cache 218 by comparing the date and/or size and/or checksum values of the data stored in the private cache 218 against the corresponding parameters of the data stored in the shared cache 320, and then overwriting all of the out-of-date data in the private cache 218 with the corresponding data in the shared cache 320. The primary caching software 214 then notifies the network client 104 that its private cache 218 has been updated, at step 626.

Thus far in the discussion of the present invention, the secondary caching server 300 and the application server 102 have been depicted as separate computer servers. However, the secondary caching server 300 may be integrated with the application server 102 in a common computer server. Similarly, although the secondary caching server 300 and the primary caching server 200 are depicted as separate computer servers, the secondary caching server 300 may be integrated with the primary caching server 200 in a common computer server. Further, as part of a turnkey solution, the functions of the application server 102, the primary caching server 200, and the secondary caching server 300 may be provided on a single computer server.

Further, the private caches 218 and the shared caches 320 have been described thus far as including only user data, such as sort/filter/query meta-data defining parameters for sort, filter and/or query commands/operations. However, the present invention is not so limited. Rather, in one variation the primary caching server 300 includes session management software integrated with the primary data caching software 214. The multi-processor computing system 100, configured with session management middleware, operates in a manner substantially identical to that described above with reference to FIGS. 4 to 6. However, each private cache 218 includes user and/or application session data unique to the session involving the associated network client 104. The primary data caching software 214 removes session data from a private cache 218 if the session data has not been used for a predetermined period of time. The shared cache 320 includes a copy of all the user and application session data. If the session management middleware requires an item of session data for a user session of one of the network clients 104, the primary data caching software 214 queries the network client's private cache 218 for the session data. If the session data was deleted from the network client's private cache 218, the session obtains the session data from the secondary caching server 300.

This variation is advantageous since it allows the size of session data normally stored on the application server 102 to be reduced. Consequently, resource contention within the application server 102 is also reduced. Furthermore, since the secondary caching server 300 maintains a copy of all the user and application session data, a user session can be redirected to an alternate or backup primary caching server 200 if one of the primary caching servers 200 becomes overloaded or fails.

To assess the performance of the present invention, a benchmark test was developed which simulated a price catalog for approximately 20,000 products of a supplier. The application server 102 was collocated with the secondary caching server 300. The application software on the application server 102 was configured to allow a customer to access a subset of the catalog data based on the different categories of the products (eg. price discount rates, product types, industry code). The product prices in the catalog were moderately volatile, so the catalog was refreshed every 5 to 10 minutes.

The response time of the application server 1–2 was measured for a non-cached system, and a system cached in accordance with the present invention. The non-cached system had a response time of 5.6 seconds for up to 250 users, and 11 seconds for up to 500 users. By interpolation, the threshold of 8 seconds would have been reached at about 375 users, when users would no longer wait for the information requested.

In contrast, the system cached in accordance with the present invention had a response time of 0.023 seconds for up to 250 users, and 0.059 seconds for up to 500 users. The response time gains over the non-cached configuration were respectively 242× and 187×. The response time gain dropped to 15× at 750 users, at which time the application server 102 was found to be 99% busy.

The present invention is defined by the claims appended hereto, with the foregoing description being illustrative of preferred embodiments of the invention. Those of ordinary skill may envisage certain modifications to the embodiments described herein which, although not explicitly suggested herein, do not depart from the scope of the invention, as defined by the appended claims.

We claim:

1. A method of caching data, which involves the steps of:
   receiving from one of a plurality of network clients a request for a data item;
   creating a private cache uniquely associated with the one network client;
   initiating association of the private cache with a shared cache, the shared cache including the requested data item and being associated with a number of the network clients; and
   updating the private cache with the requested data item.

2. The method according to claim 1, wherein the private cache updating step comprises the steps of initiating updating of the shared cache in accordance with one of a refresh request from the one network client, and an event invalidating the shared cache data, and then copying a portion of the updated shared cache data into the private cache.

3. The method according to claim 2, wherein the shared cache caches a subset of data from a data store, and the shared cache updating step comprises deriving the data subset from the data store.

4. The method according to claim 2, wherein the private cache includes cache meta-data, and the private cache updating step comprises the step of deriving the data portion in accordance with the meta-data prior to the data portion copying step.

5. The method according to claim 4, wherein the meta-data includes data sort criteria.

6. The method according to claim 2, wherein the invalidating event comprises one of an expiry date of the shared cache data, a checksum value of the shared cache data, and an update to the data store.

7. The method according to claim 6, wherein the cache associating step comprises the steps of determining an existence of the shared cache, and re-establishing the shared cache data after destruction of the shared cache.

8. The method according to claim 2, wherein the data portion comprises one of application data, and user session data.

9. A computer-readable medium for causing a programmable computer to perform the steps of:
   receiving from one of a plurality of network clients a request for a data item;
   creating a private cache uniquely associated with the one network client;
   initiating association of the private cache with a shared cache, the shared cache including the requested data item and being associated with a number of the network clients; and
   updating the private cache with the requested data item.

10. A caching server for caching data, the caching server comprising:
    receiving means for receiving from one of a plurality of network clients a request for a data item;
    cache establishing means in communication with the receiving means for creating a private cache uniquely associated with the one network client;
    cache associating means in communication with the cache establishing means for initiating association of the private cache with a shared cache, the shared cache including the requested data item and being associated with a number of the network clients; and
    updating means for updating the private cache with the requested data item.

11. A method of caching dynamically-variable data, which involves the steps of:
    maintaining a store of dynamically-variable data and a shared cache, the shared cache being associated with a plurality of network clients and including a subset of the data store;
    receiving from one of the network clients a data update to the shared cache, and storing the updated data in at least the shared cache;
    receiving from one other of the network clients a request for an item of the variable data; and
    initiating updating of a private cache associated with the one other network client, the private cache being uniquely associated with the one other network client and including a respective portion of the data subset, the data portion including the requested data item and cache data corresponding to the updated data.

12. The method according to claim 11, wherein the data update receiving step comprises the step of invalidating the corresponding data in the one other private cache.

13. The method according to claim 12, wherein the private cache includes cached meta-data, and the private cache updating step comprises the step of deriving the data portion in accordance with the meta-data.

14. The method according to claim 13, wherein the meta-data includes data sort criteria.

15. The method according to claim 12, wherein the private cache includes one of application data, and user session data.

16. The method according to claim 12, wherein the maintaining step comprises the steps of determining an existence of the shared cache, and re-establishing the shared cache data after destruction of the shared cache.

17. The method according to claim 11, wherein the maintaining step comprises the steps of updating the shared cache in accordance with one of a refresh request from one of the network clients, and an event invalidating the shared cache data.

18. The method according to claim 17, wherein the invalidating event comprises one of an expiry date of the shared cache data, a checksum value of the shared cache data, and an update from one of the network clients to the data store.

19. A computer-readable medium for causing a programmable computer to perform the steps of:

maintaining a store of dynamically-variable data and a shared cache, the shared cache being associated with a plurality of network clients and including a subset of the data store;

receiving from one of the network clients a data update to the shared cache, and storing the updated data in at least the shared cache;

receiving from one other of the network clients a request for an item of the variable data; and updating a private cache associated with the one other network client, the private cache being uniquely associated with the one other network client and including a respective portion of the data subset, the data portion including the requested data item and cache data corresponding to the updated data.

20. A caching server for caching data, the caching server comprising:

a shared cache associated with a plurality of network clients;

data update means in communication with the shared cache for receiving from one of the network clients a data update to the shared cache, and storing the updated data in at least the shared cache;

receiving means for receiving from one other of the network clients a request for an item of the variable data; and updating means for updating a private cache associated with the one other network client, the private cache being uniquely associated with the one other network client and including a respective portion of the data subset, the data portion including the requested data item and cache data corresponding to the updated data.

21. A method of caching dynamically-variable data, which involves the steps of:

maintaining a store of dynamically-variable data, the data store including one of application data, and user session data;

dynamically establishing a first level cache and a second level cache in response to a request for the stored data, the caches caching data comprising a subset of the stored data; and dynamically removing at least one of the caches after invalidation thereof.

22. The method according to claim 21, wherein the cache establishing step comprises the steps of receiving the data request from one of a plurality of network clients, associating the second level cache with the plurality of network clients, uniquely allocating the first level cache with the one network client, and associating the first level cache with the second level cache, the first level cache including cache data comprising a portion of the second level cached data.

23. The method according to claim 22, wherein the first level cache includes cached meta-data, and the cache establishing step comprises the step of deriving the data subset in accordance with the meta-data.

24. The method according to claim 23, wherein the meta-data includes data sort criteria.

25. The method according to claim 21, wherein the invalidation occurs after one of an expiry date of the second level cache data, a checksum value of the second level cache data, and an update from one of the network clients to the data store.

* * * * *